Oct. 11, 1960  R. L. RICE ET AL  2,955,623
WIREBOUND BOX ASSEMBLING MACHINE
Filed Nov. 17, 1955  12 Sheets-Sheet 3

INVENTORS
Richard L. Rice
William J. Hogan
David G. Kingsley
BY
Curtis Morris + Safford
ATTORNEYS Oct. 11, 1960
R. L. RICE ET AL
2,955,623
WIREBOUND BOX ASSEMBLING MACHINE
Filed Nov. 17, 1955
12 Sheets-Sheet 4
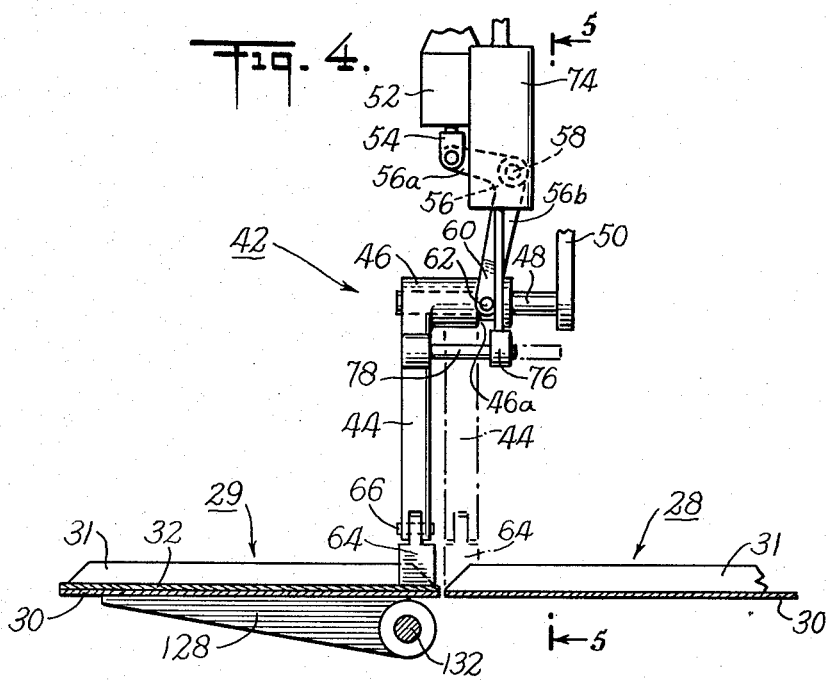
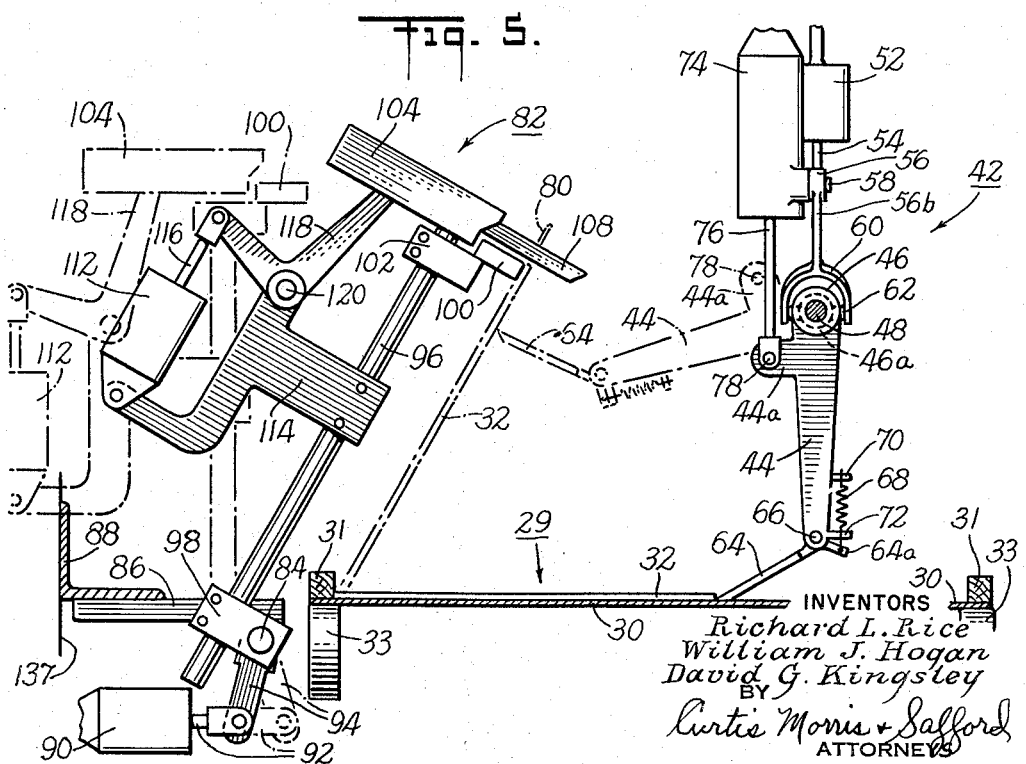
INVENTORS
Richard L. Rice
William J. Hogan
David G. Kingsley
BY
Curtis Morris + Safford
ATTORNEYS

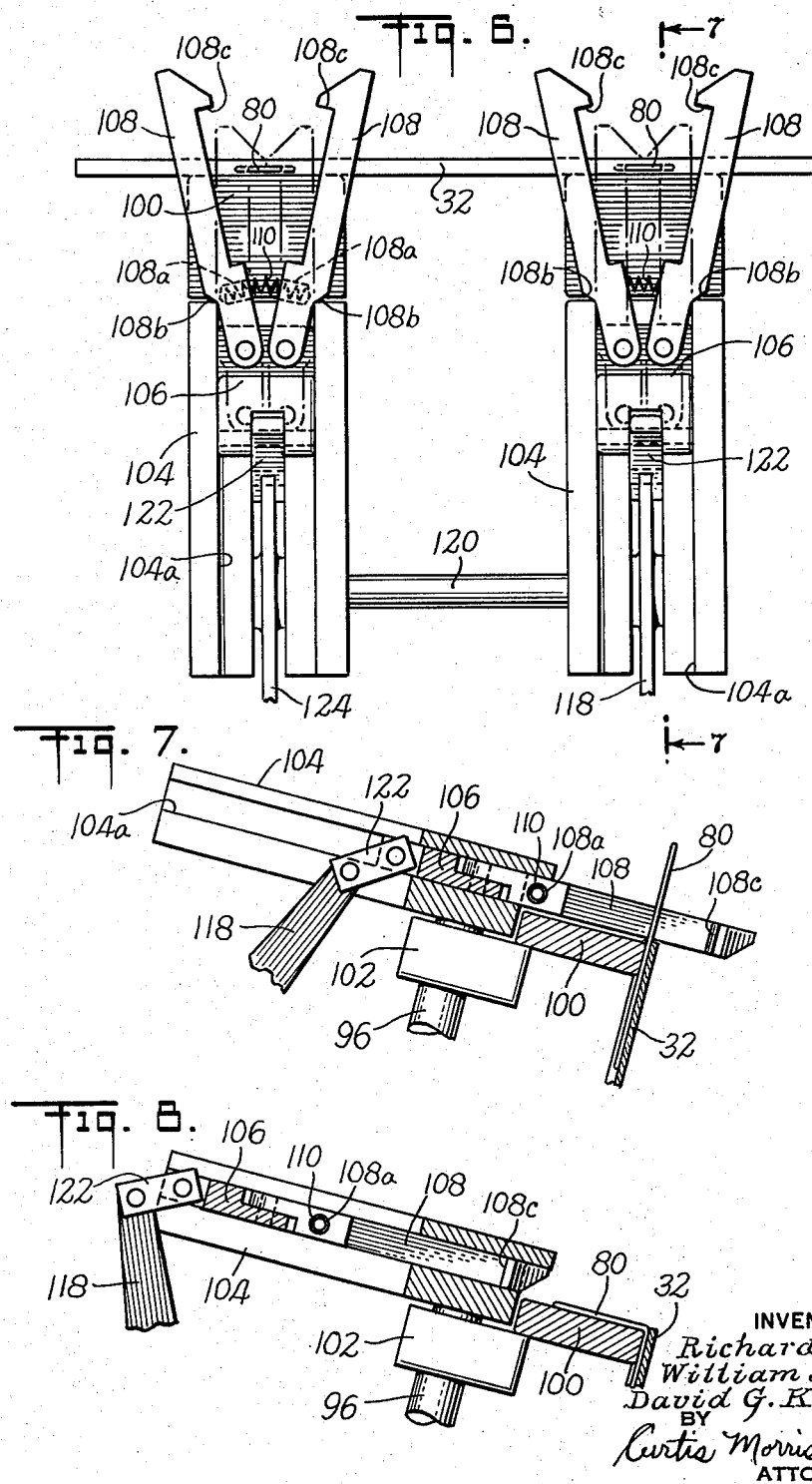

Oct. 11, 1960 R. L. RICE ET AL 2,955,623
WIREBOUND BOX ASSEMBLING MACHINE
Filed Nov. 17, 1955 12 Sheets-Sheet 6

INVENTORS
Richard L. Rice
William J. Hogan
David G. Kingsley
BY
Curtis Morris & Safford
ATTORNEYS

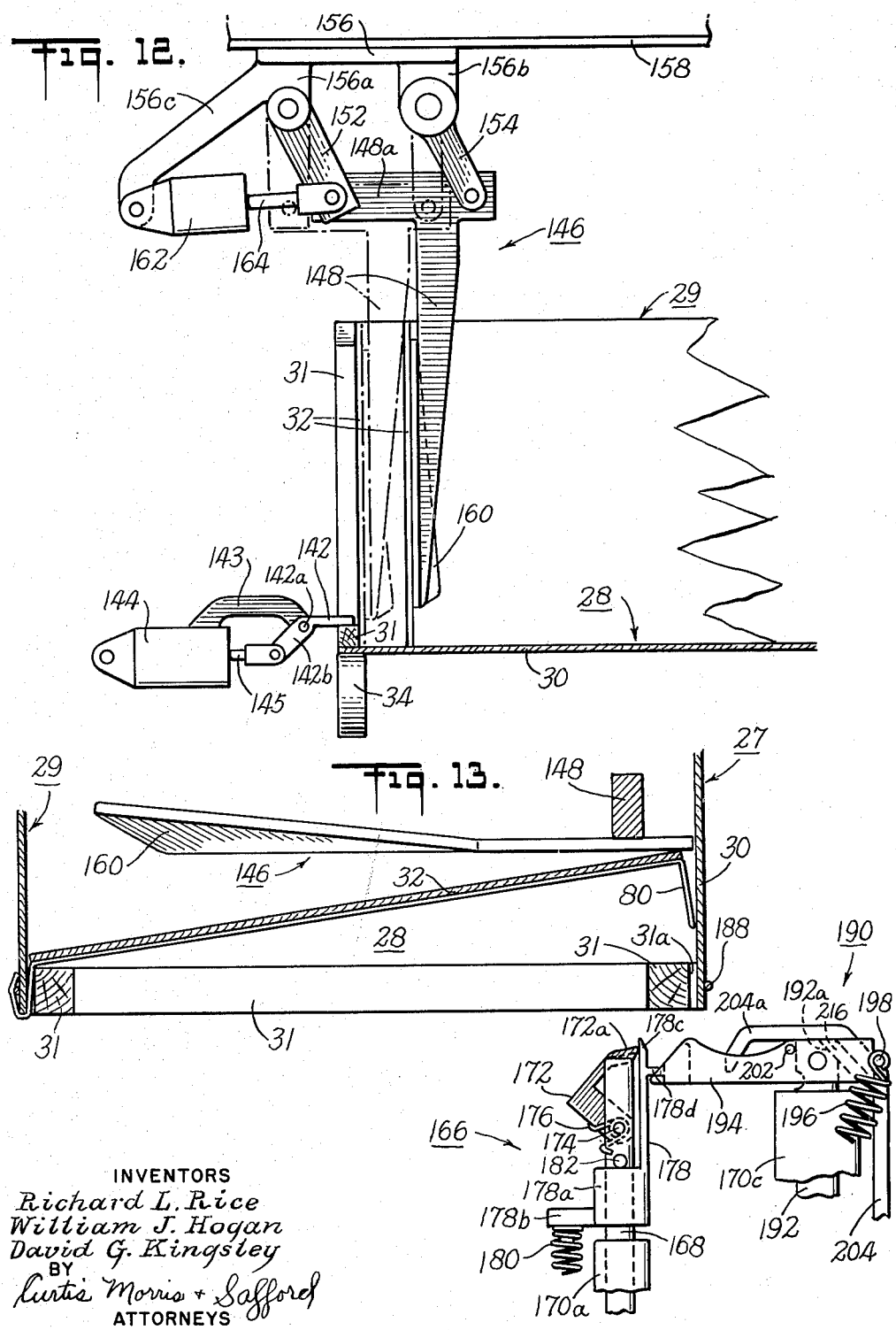

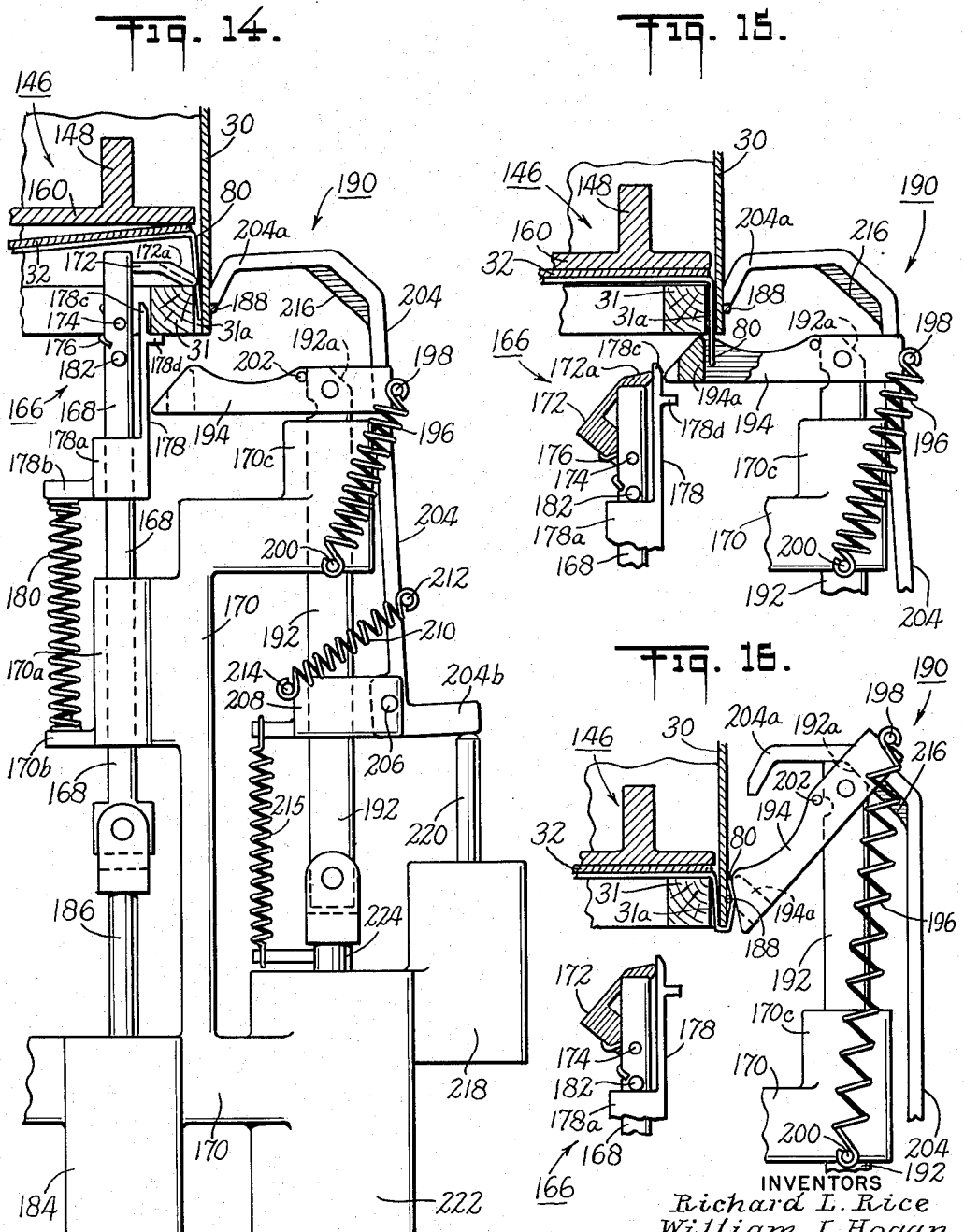

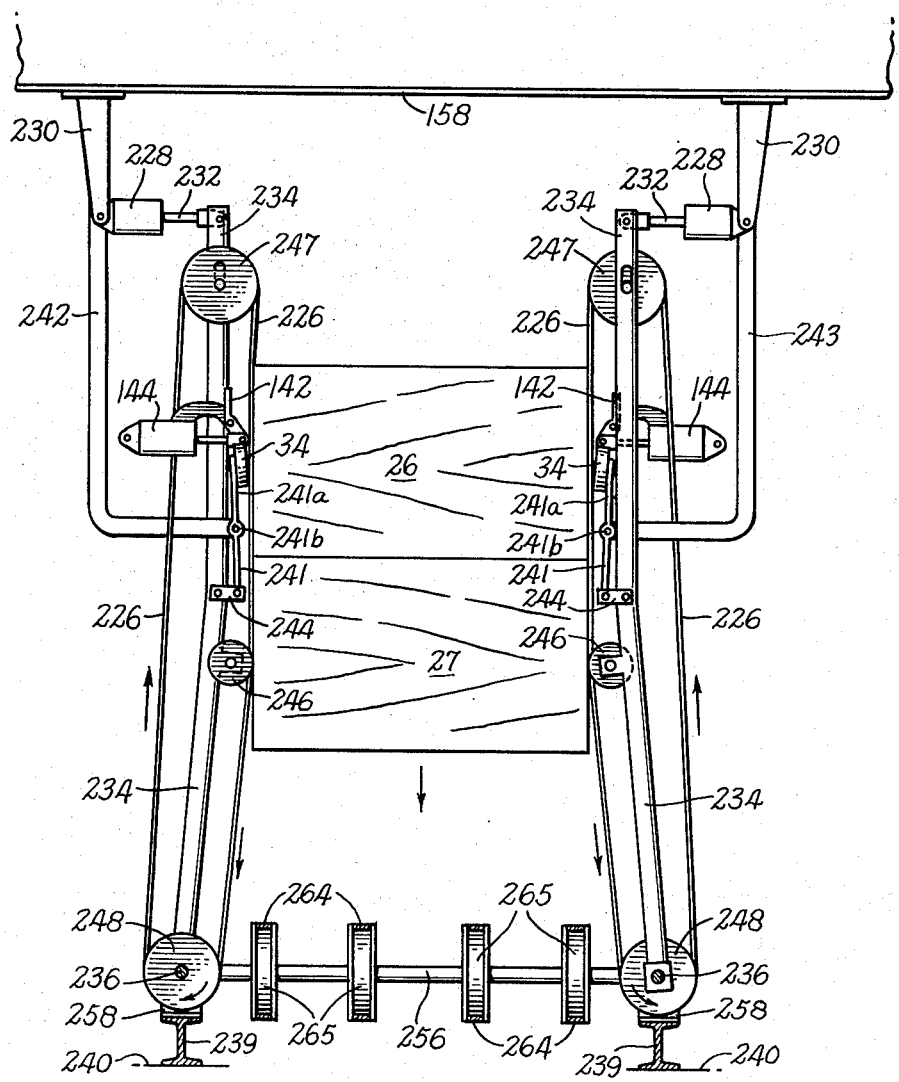

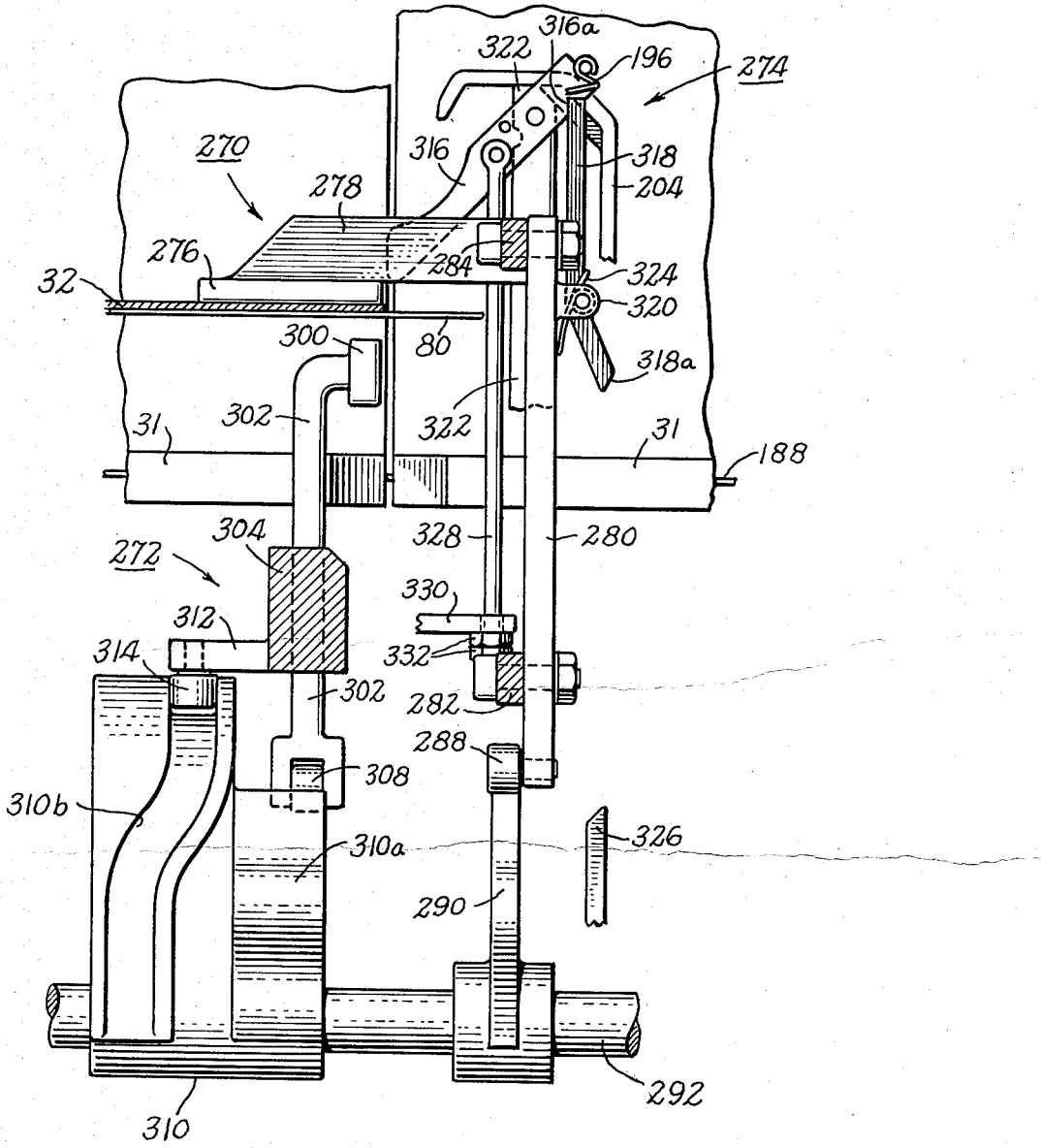

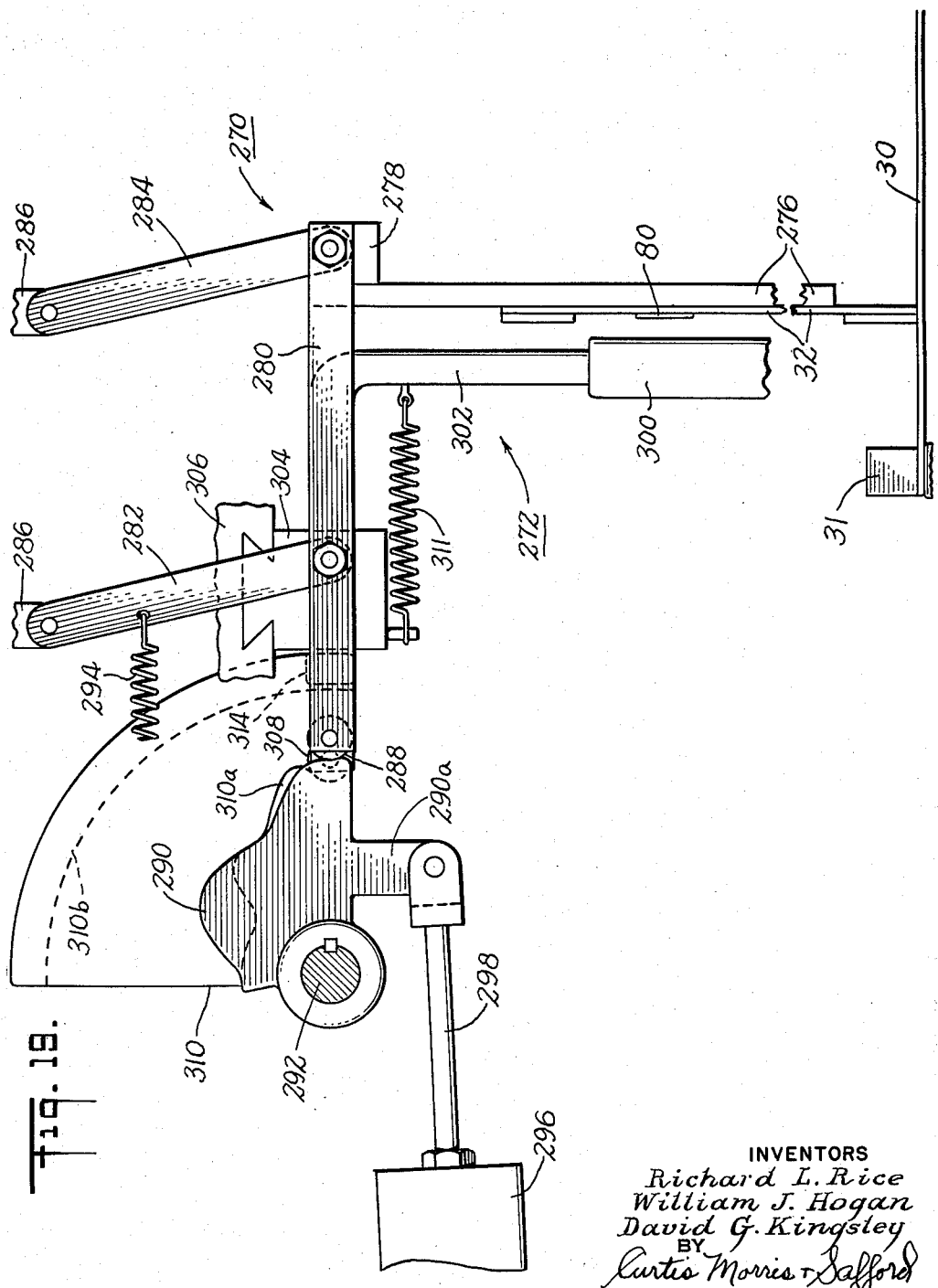

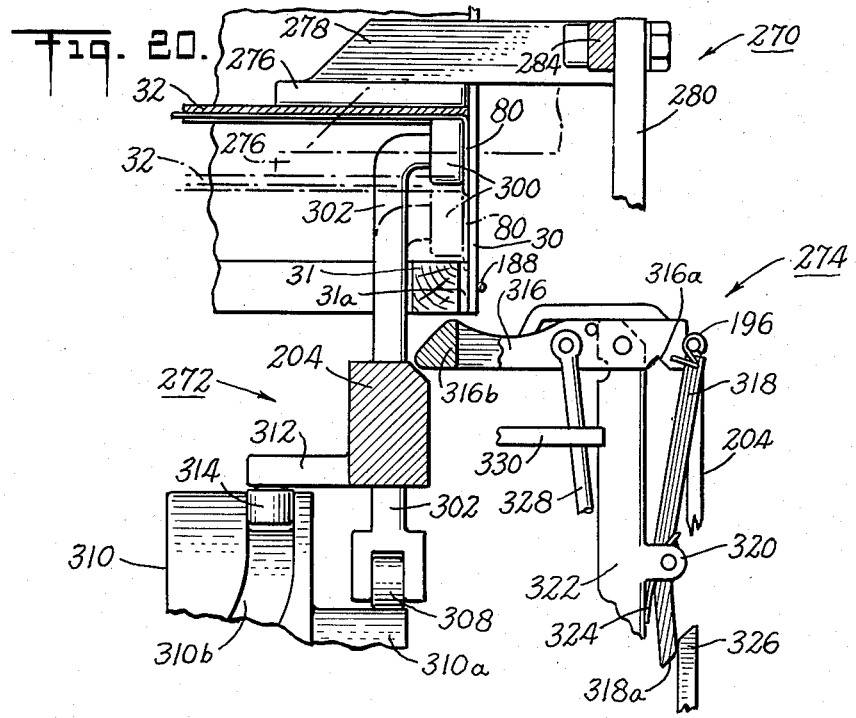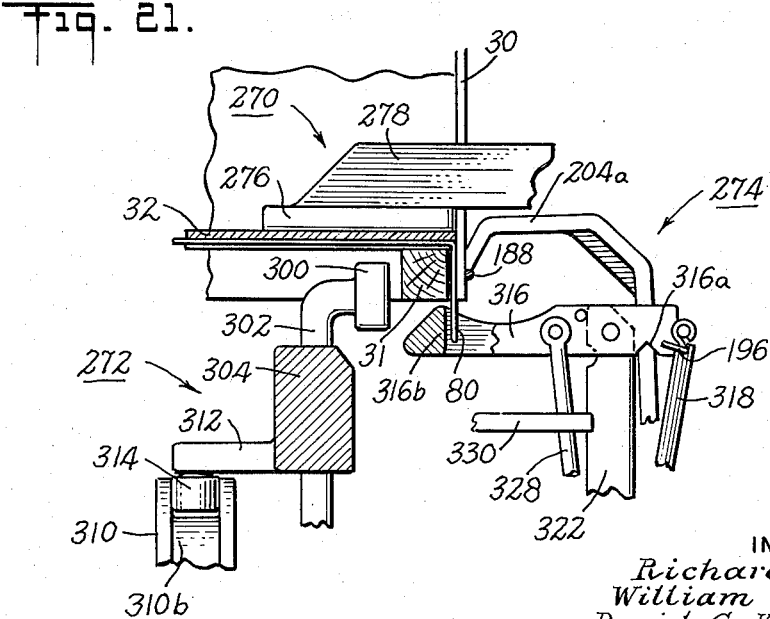

United States Patent Office 2,955,623
Patented Oct. 11, 1960

2,955,623
WIREBOUND BOX ASSEMBLING MACHINE

Richard L. Rice, Mountain Lakes, William J. Hogan, Dover, and David G. Kingsley, Mountain Lakes, N.J., assignors to Stapling Machines Co., Rockaway, N.J., a corporation of Delaware Filed Nov. 17, 1955, Ser. No. 547,476

10 Claims. (Cl. 140—93)

This invention relates to a machine for assembling wirebound boxes (which term is used herein to include crates and other similar containers) from knocked-down wirebound box blanks.

The present invention is particularly applicable to the assembly of wirebound boxes of the type known in the trade as "All Bound Boxes." These boxes, which are more fully shown and described in U.S. Patent No. 2,281,908, are formed from box blanks having a plurality, usually four, box sections or sides each comprising side material or slats with reinforcing cleats secured to the inner face thereof along the lateral edges of the box blank, with the several box sections foldably secured together by binding wires extending longitudinally of the box blank and secured to the box sections by staples driven astride the binding wires, through the side material or slats and into the cleats. Each end of each of the binding wires is provided with a loop fastener or so-called "Rock Fastener" which is formed by bending the projecting end of the binding wire back over the edge of the box blank and driving it through the side material or slats. When the box blank is folded around to set up the box, the two loop fasteners at opposite ends of each binding wire come into opposition with each other at the closing corner of the box and one of these loops, being somewhat narrower than the other, is inserted through the latter and bent down against the box to secure the box closed.

The two box ends are likewise provided with binding wires stapled thereto and each end of these binding wires is provided with a similar loop fastener. On the two sections of the box blank which form the front and back sides of the box, the outside cleats are provided with notches through which the loop fasteners on the box ends are inserted, these loop fasteners then being bent around the outside binding wires to secure the box ends in position and maintain the properly assembled relation of the box.

To save space, the box blanks are usually stored and shipped knocked down or flat. In most instances, the two box ends are attached to the box blank, one box end being hingedly attached at one edge to each of the front and rear sections of the box blank, as disclosed in the aforesaid Patent No. 2,281,908.

Heretofore the operation of setting up the knocked-down box blanks into assembled boxes has been performed by manual labor at the point where the boxes are packed. The box blanks are somewhat unwieldy to handle and the job of assembling them is one which has required considerable dexterity and consumed substantial time. The operation of assembling wirebound boxes has therefore been an appreciable factor in the cost of using these boxes.

The present invention provides for the first time a machine which is capable of receiving wirebound box blanks (with box ends either attached or separate), lifting the box ends up from the box blanks (in the case of box blanks with attached box ends), sizing and straightening the loop fasteners at the free edges of the box ends and bending them perpendicularly to the outer surfaces of the box ends, folding up the front and rear sections of the box blanks, inserting the loop fasteners on the box ends through the notches of the cleats on the front and rear sections, bending these loop fasteners around the outside binding wires to secure the box in assembled form, and finally delivering the assembled box out of the machine.

In the drawings:

Figure 4 is an enlarged, fragmentary vertical sectional view taken generally along the line 4—4 of Figure 2 and showing particularly the mechanism for lifting the attached box ends.

Figure 5 is a vertical sectional view taken generally along the line 5—5 of Figure 4, showing not only the mechanism for lifting the box ends, but also the mechanism for sizing and straightening the loop fasteners and bending them perpendicularly to the outer surfaces of the box ends.

Figure 6 is a fragmentary horizontal sectional view taken along the line 6—6 of Figure 1, showing the loop forming mechanism at still larger scale.

Figure 7 is a fragmentary vertical sectional view taken generally along the line 7—7 of Figure 6.

Figure 8 is a view similar to Figure 7 but showing the loop forming mechanism at a subsequent stage of operation.

Figure 12 is an enlarged, fragmentary vertical sectional view taken generally along the line 12—12 of Figure 11.

Figure 13 is an enlarged horizontal sectional view taken generally along the line 13—13 of Figure 10, showing the relative positions of the loop guiding and loop bending mechanisms in their retracted positions.

Figure 14 is an enlarged, fragmentary horizontal sectional view of the loop guiding and loop bending mechanisms at an early stage of their operation.

Figures 15 and 16 are fragmentary views of the mechanisms shown in Figure 14 at successive subsequent stages of their operation.

Figure 17 is a somewhat diagrammatic end elevational view of the machine, showing in particular the conveyor belts for moving the assembled boxes out of the machine.

Figure 18 is a view similar to Figure 14 but showing a modified form of box assembling machine adapted for the assembly of wirebound box blanks having unattached box ends.

Figure 19 is a fragmentary side elevational view of the mechanism shown in Figure 18.

Figures 20 and 21 are fragmentary views similar to Figure 18, but showing the mechanism in successive subsequent stages of operation.

Figure 1:
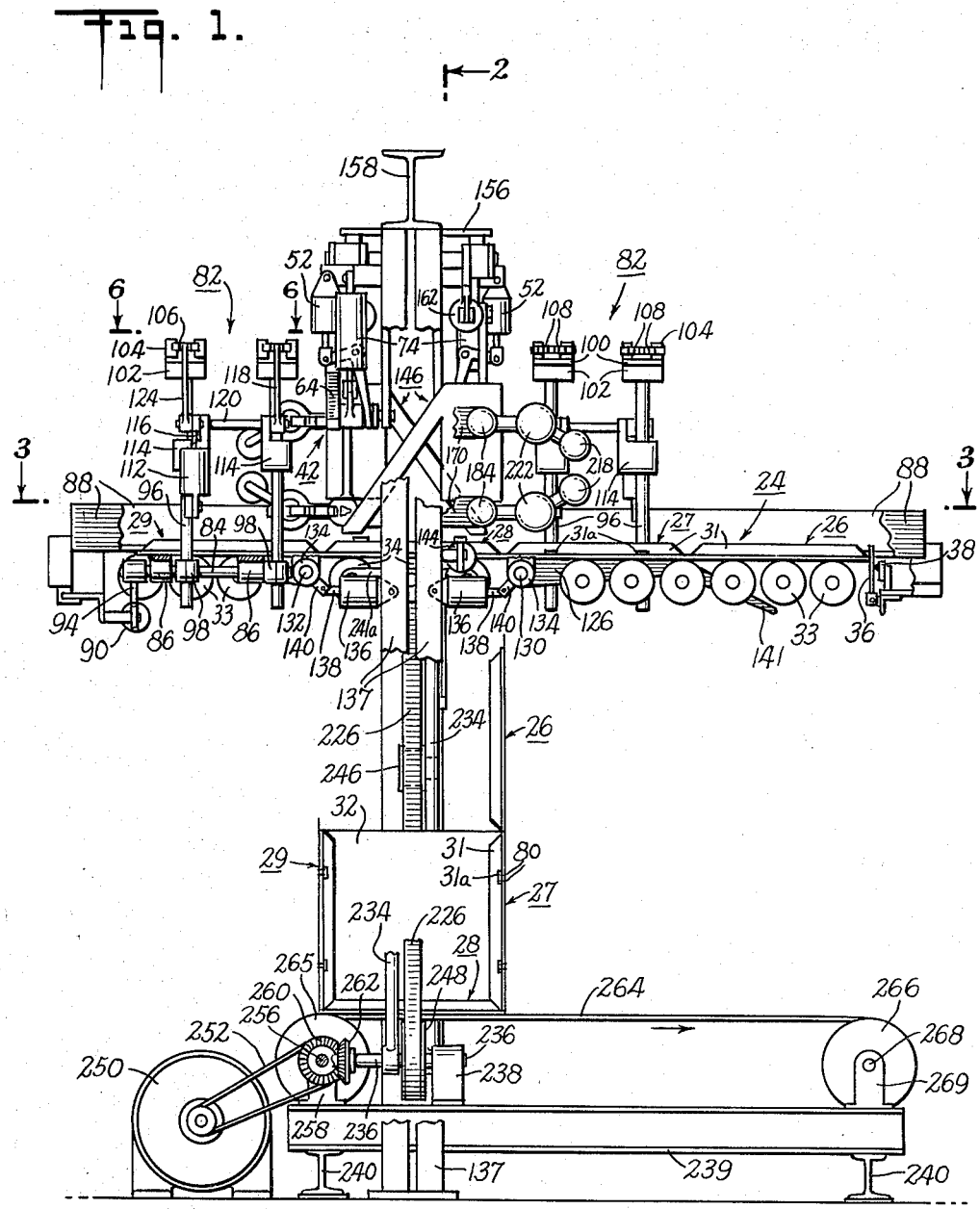
Figure 1 is a side elevational view of a machine embodying features of the present invention, and adapted to assemble wirebound box blanks having attached box ends, the machine being shown partially broken away to reveal its construction more clearly.
Figure 2:
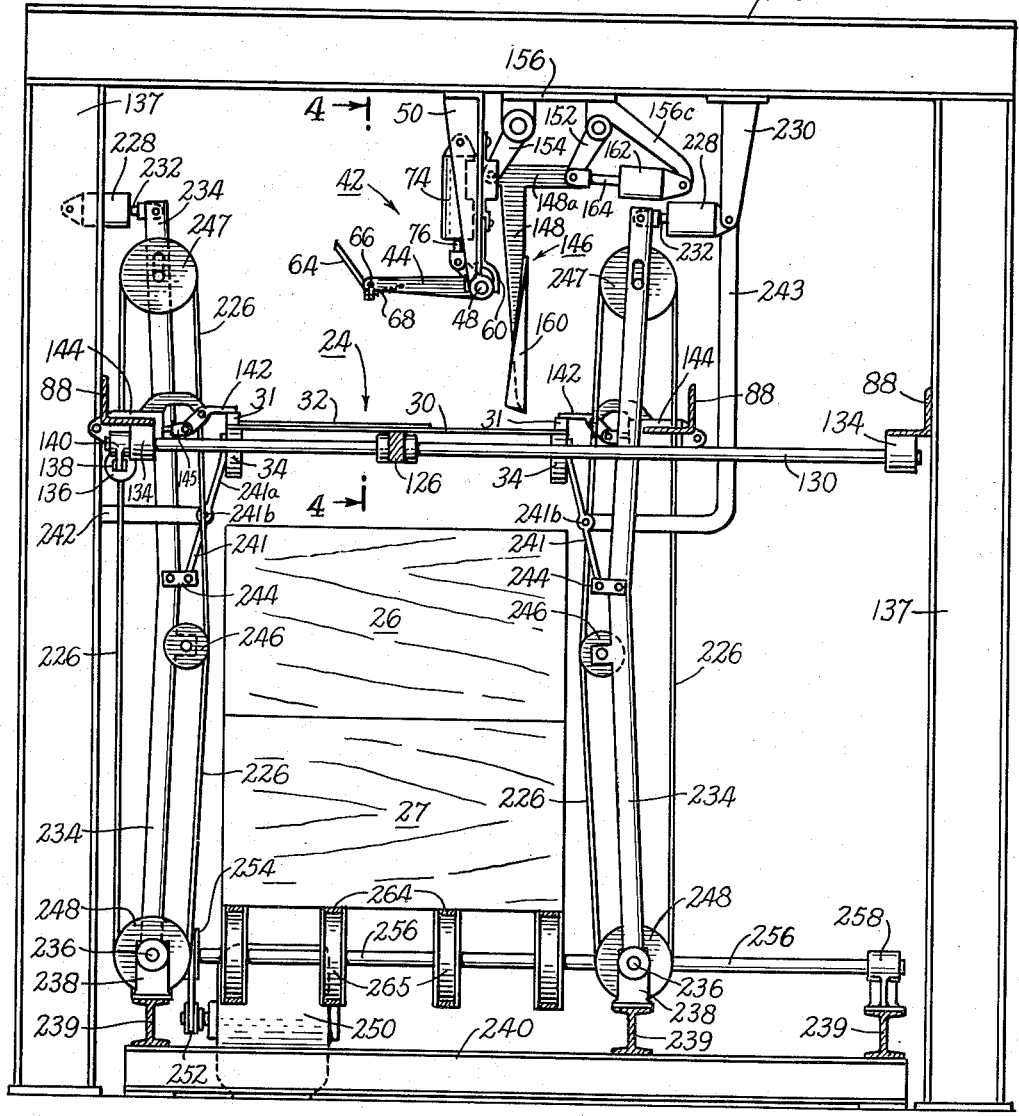
Figure 2 is a transverse vertical sectional view taken generally along the line 2—2 of Figure 1.
Figure 3:
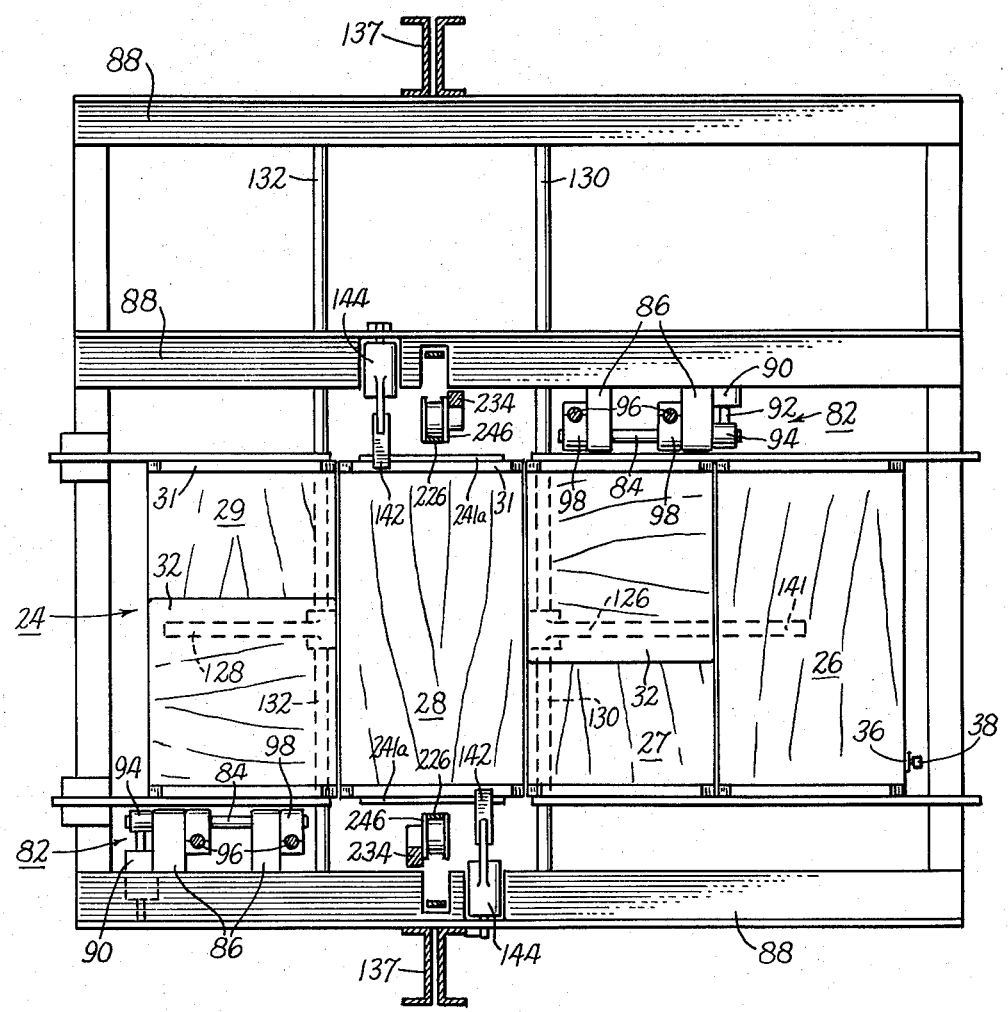
Figure 3 is a horizontal sectional view taken generally along the line 3—3 of Figure 1.

In Figures 1, 2, and 3, the box assembly machine is pictured just as a knocked-down box blank, generally indicated 24, reaches proper position to be operated upon. As may be seen in these figures, the box blanks include four box sections or sides 26, 27, 28, and 29, each composed of side material 30 with cleats 31 secured at the upper face of the side material along the lateral edges of the box blank. The box blanks enter the machine with the box section 26 which forms the top or lid of the assembled box at the leading end. Next follows the box section 27 which forms the rear side of the box, then the section 28 which forms the bottom of the box, and finally the section 29 which forms the front side of the box. The two box ends 32 are hingedly secured at one edge to opposite lateral edges of the rear and front sections of the box 27 and 29, respectively.

As may be seen in Figure 1, the box blanks 24 are supported in the assembling machine on a series of closely spaced rollers 33 and 34 which, as may be seen in Figure 2, are arranged in two horizontal rows which engage the underside of the box blanks along their lateral edges. The box blanks may be fed onto the rollers 33 and 34 by hand, or by a conveyor extending, for example, from the area where the knocked-down box blanks are stored prior to use. When the box blanks reach the proper position to be operated upon, their leading ends (their right-hand ends as viewed in Figure 1) strike a stop lever 36, the lower end of which is pivotally mounted on the frame of the machine and the upper end of which projects upwardly into the path of the oncoming box blanks. Arranged behind this stop lever 36 is a push-button electrical switch 38 which is actuated by the stop lever 36 when it is engaged by the leading end of a box blank.

The actuation of the switch 38 initiates the sequence of operation of the various mechanisms of the machine. As will be seen hereinafter, most of these various mechanisms are actuated by means of air cylinders. Suitably, the operation of the several air cylinders may be controlled by a master cam shaft carrying a plurality of cams, one for each air cylinder, and each operating a separate valve to supply compressed air to the respective cylinders at the appropriate times. This master cam shaft rotates one revolution for each cycle of operation of the machine, being driven through an electrically-controlled clutch which is engaged by closure of the switch 38, and which automatically disengages after one revolution of the cam shaft. This conventional arrangement will be readily understood by those familiar with other types of automatic machinery, without the necessity of detailed illustration.

The box end lifting mechanism

The first operation which is performed upon the box blank is the raising of the attached box ends 32 (Figures 2 and 3). This is accomplished by the mechanism which is generally indicated at 42 in Figure 2 and which is shown in greater detail in Figures 4 and 5. The mechanism for operating on only one of the box ends will be described in detail, it being understood that a similar mechanism is provided for performing identical operations upon the other end of the box blank.

Each end lifting mechanism includes a lifter arm 44 (Figures 4 and 5) which extends outwardly from a collar 46 which is supported for both rotational and longitudinal sliding movement on a horizontal shaft 48 projecting from the lower end of a bracket 50 (Figure 4) which extends downwardly from the frame of the machine.

At the start of the box assembly cycle, the lifter arm 44 and collar 46 are in the position shown in broken lines in Figure 4, in which they are above one edge of the bottom section 28 of the box blank. As the box assembly cycle commences, the lifter arm 44 and collar 46 are shifted laterally to the position shown in full lines in Figure 4, at which they are above the edge of the adjacent front section 29, to which one of the box ends 32 is hingedly attached.

This lateral shifting of the lifter arm 44 and collar 46 is accomplished by means of an air cylinder 52, the casing of which is pivotally attached to the frame of the machine and the piston rod 54 of which is pivotally attached to one arm 56a of a bell crank 56 which is fulcrumed on a stud 58. The other arm 56b of the bell crank 56 is formed at its lower end into a fork 60 carrying inwardly projecting pins 62 which are loosely received in a circumferential slot 46a in the collar 46.

The lifter arm 44 is provided at its free end with a lifter finger 64 which is pivotally mounted on a pin 66 and is urged in a counterclockwise direction, as viewed in Figure 5, by means of coil spring 68 which is tensioned between a tab 64a projecting rearwardly from the finger 64 and a stud 70 projecting from the lifter arm 44. The movement of the lifter finger 64 under the influence of the spring 68 is limited by engagement of the tab 64a with a stop pin 72 (Figure 5) projecting from the lower end of the arm 44.

The lifter arm 44 is normally maintained in an upper, retracted position, in which it is illustrated in Figure 2, but is swung in a counterclockwise direction, as viewed in Figure 5, about its supporting shaft 48 immediately after it is shifted laterally over the front section 29 of the box blank, as previously described. This swinging movement of the lifter arm 44 is effected by means of an air cylinder 74, the casing of which is pivotally attached to the frame of the machine and the piston rod 76 of which pivotally and slidably engages an elongated pin 78 projecting from a lateral projection 44a on the lifter arm 44.

As the lifter arm 44 swings downwardly to the position shown in full lines in Figure 5, the finger 64 snaps past the edge of the box end 32 and bears against the upper surface of the side material 30 of the box section. Then the air cylinder 74 is actuated in the opposite direction to raise the lifter arm 44 from the position shown in full lines in Figure 5 to that shown in broken lines. During this upward movement, the finger 64 slides beneath the edge of the box end 32 and raises the box end to an angle of roughly 75 degrees relative to the box blank, as illustrated in broken lines in Figure 5.

The loop forming mechanism

The raising of the box end 32 places the loop fasteners 80 which project from its free edge in position to be operated upon by a loop forming mechanism generally indicated 82 (Fig. 5). This loop forming mechanism 82 is fixed at its lower end on a rock shaft 84 which is rotatably supported by a pair of brackets 86 secured to the angle members 88 which extend longitudinally of the machine and form part of the frame thereof.

The loop forming mechanism 82 is normally retained in an outer, retracted position, in which it is shown in broken lines in Figure 4, but it is pivoted inwardly to the position shown in full lines, simultaneously with the lateral shifting of the lifter arms 44 (Figure 4) as previously described. This is accomplished by an air cylinder 90, the casing of which is pivotally attached to the frame of the machine and the piston rod 92 of which is pivotally attached to the lower end of a crank arm 94, the upper end of which is fixed on the rock shaft 84.

The frame of the loop bending assembly includes a pair of generally upright, tubular members 96 which are adjustably secured to the rock shaft 84 by means of clamps 98. The tubular members 96 carry at their upper ends an anvil bar 100 which is adjustably secured to them by means of clamps 102. These anvil bars 100 are positioned so as to engage the upper edge of the outer face of the box end 32—i.e., the face which is at the outside of the assembled box.

Each of the tubular members 96 also carries at its upper end a transverse head member 104 which, as shown in Figures 6–8, is provided with opposed longitudinal grooves 104a in which a slide member 106 is reciprocably supported. Pivotally attached to the forward end of the slide member 106 are a pair of loop forming fingers 108 which are yieldably urged apart by means of a compression spring 110, the opposite ends of which are received in bore holes 108a in the adjacent faces of the fingers 108.

The spring 110 normally maintains the fingers 108 in a widely spaced relation, in which they are shown in full lines in Figure 6, with further separation of the fingers 108 being prevented by engagement of their outer faces with the front corners of the grooves 104a in the head 104. The outer faces of the fingers 108 are provided with outwardly flaring cam surfaces 108b so that retraction of the slide 106 from the position shown in full lines in Figure 6 to the position shown in broken lines will cause the fingers 108 to be cammed together to the position shown in broken lines.

Such movement of the slide 106 is effected by means of an air cylinder 112 (Figure 5), the casing of which is pivotally attached to an irregularly shaped bracket 114 which is secured to one of the tubular members 96. The piston rod 116 of the air cylinder 112 is pivotally attached to one arm of a bell crank 118 fixed on a rock shaft 120 which is pivotally supported by the bracket 114 and by a similar bracket secured to the other tubular member 96 (see Figure 1). The other arm of the bell crank 118 extends upwardly and, as shown particularly in Figures 7 and 8, is connected by means of a link 122 to the rear end of the slide 106. The slide 106 in the head member 104 which is secured at the upper end of the other tubular member 96 is similarly actuated by means of a crank arm 124 (Figure 1), the lower end of which is fixed on the rock shaft 120. It will thus be seen that actuation of the air cylinder 112 to draw its piston rod 116 downwardly will cause simultaneous retraction of the slides 106 in each of the heads 104 and this will cause the fingers 108 first to come together into the position in which they are shown in broken lines in Figure 6 and finally to move rearwardly together to the position shown in Figure 8.

As the fingers 108 come together from the spaced position shown in full lines in Figure 6 to the position shown in broken lines, they close in on the loop fastener 80 from opposite sides and, if the loop fastener is bent off line, they straighten and center it, bringing it to the position illustrated in full lines in Figure 6. Then, as the slide 106 continues its rearward movement, the hook portions 108c at the forward ends of the fingers 108 bend the loop fastener 80 around the anvil bar 100, as shown in Figure 8, to a position where the loop fasteners extend substantially perpendicularly to the outer face of the box end 32.

The position of the two tubular members 96 and their respective clamps 98 is adjustable along the rock bar 84 (Figure 5) so as to properly align the head members 104 and their fingers 108 with the positions of the loop fasteners 80. Thus, the machine may be adjusted to accommodate different types of box blanks.

After the loops have been thus aligned and bent, the air cylinder 90 (Figure 5) is again actuated to rock the loop forming assembly back to its retracted position as shown in broken lines in Figure 5. This clears the way for the rear and front sections 27 and 29 of the box blank to be folded upwardly about the bottom section 28.

The folding mechanism

Figure 9:
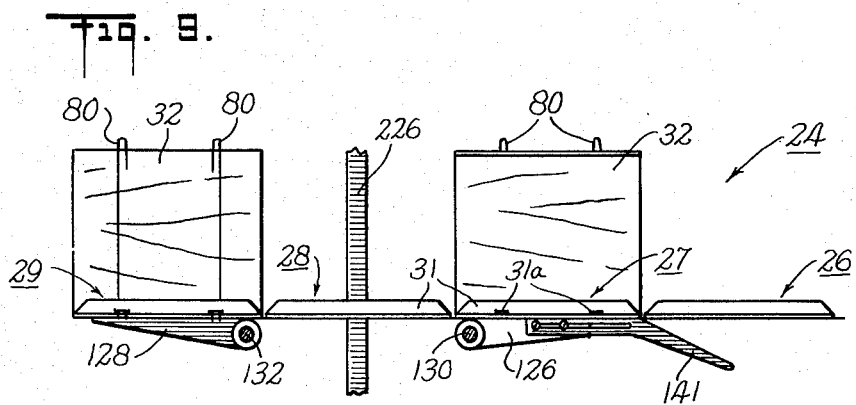
Figure 9 is a somewhat diagrammatic, fragmentary, side elevational view of the machine, illustrating the position of the box blank after the box ends have been raised and the loop fasteners have been bent perpendicular to the box ends, preparatory to folding up of the front and rear sections of the box blank.
Figure 10:
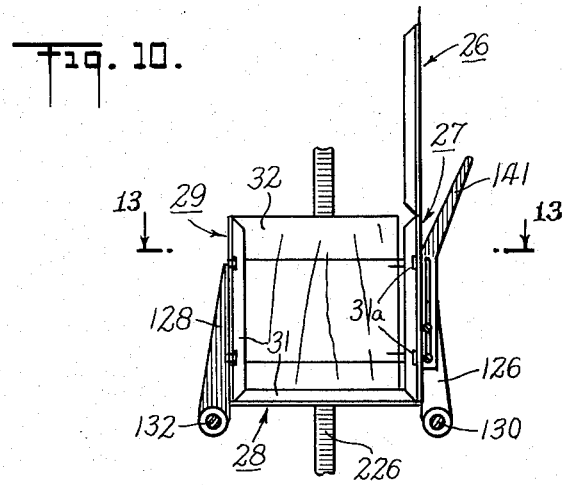
Figure 10 is a view similar to Figure 9 but showing the position of the box blank after its front and rear sections have been folded upwardly around the bottom section.

The operation of bending up the rear and front sections of the box blank, which is illustrated in Figures 9 and 10, is accomplished by a pair of lifter arms 126 and 128 which are respectively fixed on rock shafts 130 and 132.

As shown in Figure 2, these rock shafts 130 and 132 extend transversely of the machine and are journalled in bearings 134 secured to the horizontal framing members 88. The rock shafts 130 and 132 are actuated by means of air cylinders 136, the casings of which are pivotally attached to one of the upright dual channel members 137 which form part of the machine frame, and the piston rods 138 of which are pivotally attached to crank arms 140 fixed on the rock shafts 130 and 132.

Actuation of the air cylinders 136 causes the lifter arms 126 and 128 to rotate in opposite directions from the position shown in Figure 9 to the position shown in Figure 10, folding the rear and front sections 27 and 29, respectively, of the box blank upwardly about the bottom section 28. The lifter arm 126 is provided with an adjustable angular extension 141 which engages the top section 26 of the box blank and keeps it from bending backwardly, maintaining it in a generally vertical position as illustrated in Figure 10.

To hold down the bottom section 28 of the box blank as the rear and front sections 27 and 29 are bent upwardly, as may be seen in Figure 2 there are provided at opposite sides of the machine in position to engage the upper faces of the cleats 31, a pair of clamps 142. These clamps are pivotally mounted at 142a on brackets 143 which extend inwardly from the horizontal framing members 88. The clamps 142 are actuated by means of air cylinders 144, the casings of which are pivotally attached to the frame of the machine and the piston rods 145 of which are pivotally attached to offset extensions 142b of the clamp members 142. Actuation of the air cylinders 144 thus causes pivotal movement of the clamps 142 to bring them into forceable engagement with the upper faces of the cleats 31 and press the lateral edges of the bottom section 28 of the box blank down firmly against the rollers 34.

The end pressure mechanism

Figure 11:
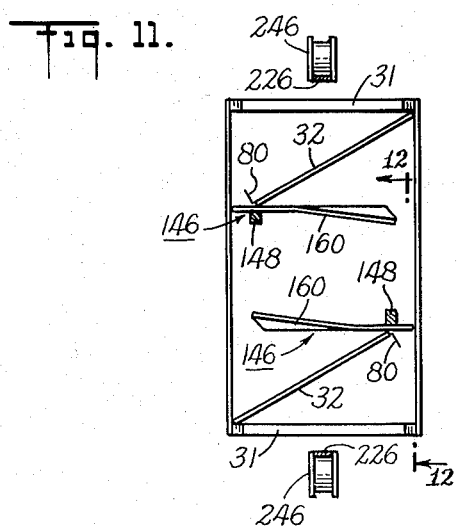
Figure 11 is a somewhat diagrammatic, fragmentary, plan view of the box blank after the front and rear sections have been folded upwardly, illustrating the relative positions of the box ends and the presser members which push them into final position.

As the rear and front sections of the box blank are folded upwardly, the box ends 32 come to the inside of the box to the positions illustrated in Figure 11, at which they are respectively interposed in front of a pair of presser mechanisms generally indicated 146. As may be seen in Figure 12, these presser mechanisms 146 include arms 148 which extend generally vertically and have at their upper ends transverse head portions 148a which are supported by a parallelogram assembly including a pair of parallel links 152 and 154 of equal length, the lower ends of these links being pivotally attached to opposite ends of the head portion 148a and the upper ends being pivotally attached to brackets 156a and 156b depending from a plate 156 secured to the overhead I-beam 158 of the machine frame.

As may be seen in Figure 13, the presser arm 148 has attached to its outer face a large presser plate 160 which is adapted to bear against the inner surface of the box end 32. The free end of this presser plate 160 is bent backwardly and slightly inclined so that as the rear and front sections 27 and 29 of the box blank are folded upwardly, the box ends 32 will engage the sloping surface of the presser plates 160 and be guided progressively outward to the position illustrated in Figure 13.

In this position, the loop fasteners 80 on each box end 32 are directed toward the notches 31a in the adjacent cleat 31, with the outer ends of the loop fasteners spaced a short distance from the entrance to the notches 31a at the inner faces of the cleat 31. The loop fasteners 80 are thus in position to be pressed through the notches 31 by the presser plate 160.

The presser plate 160 is driven by means of an air cylinder 162 (Figure 12), the casing of which is pivotally secured at the outer end of an arm 156c which extends obliquely downward from the plate 156, while the piston rod 164 of the air cylinder 162 is pivotally attached to the adjacent end of the head portion 148a of the presser arm 148. Actuation of the air cylinder 162 thus causes the presser arm 148 and presser plate 160 to move from the position shown in full lines in Figure 12 to the position shown in broken lines, the presser plate 160 remaining vertical and parallel to the plane of the end of the box blank during this movement by virtue of the parallelogram type of suspension employed.

This movement of the presser plate 160 pushes the box end 32 outwardly, with the loop fasteners 80 entering the notches 31a in the cleats 31.

The loop guiding mechanism

In order to insure that the loop fasteners 80 will enter properly into the notches 31a, there is provided a loop guiding mechanism indicated generally at 166 and appearing partially in the lower right-hand corner of Figure 13 and more fully in Figure 14. This loop guiding mechanism 166 includes a supporting rod 168 which is slidably supported and keyed against rotation in a sleeve 170a formed as an integral part of an irregularly shaped bracket 170 which is adjustably secured to the machine frame.

Supported at the outer end of the rod 168 is a guide member 172 which, as may be seen most clearly in Figure 13, is generally L-shaped and is pivotally attached at one end to the rod 168 by means of a pin 174. The guide member 172 is urged in a clockwise direction, as viewed in Figures 13 and 14, by means of a spring 176 which is coiled around the pin 174 and the opposite ends of which respectively engage the rod 168 and the guide member 172.

In certain positions of the supporting rod 168, clockwise movement of the guide member 172 under the influence of the spring 176 is prevented by a retainer 178 which is provided at its rearward end with a sleeve 178a which is slidably supported on the rod 168. The retainer 178 is urged toward the outer end of the rod 168 by a coil spring 180 which is compressed between a projecting tab 178b on the retainer 178 and a similar tab 170b on the bracket 170. The outward movement of the retainer 178 under the influence of the spring 180 is limited by engagement of the sleeve 178a of the retainer 178 with a stop pin 182 projecting from the rod 168. When the retainer 178 is in its outer position, with the sleeve 178a against the stop pin 182, as shown in Figure 13, the forwardly projecting portion 178c of the retainer engages the guide member 172 and retains it in a counterclockwise position against the force of the spring 176.

To bring the guide member 172 into operative position, the rod 168 is driven inwardly toward the box blank by means of an air cylinder 184 (Figure 14), the casing of which is fixed on the bracket 170 and the piston rod 186 of which is attached to the outer end of the rod 168. As the rod 168 moves toward the box blank, the outer face of the cleat 31 is engaged by a projection 178d on the retainer 178, as illustrated in Figure 14, thus preventing inward movement of the retainer 178.

As the supporting rod 168 continues its inward movement to the full stroke of the piston rod 186, the guide member 172 will clear the projecting end 178c of the retainer 178 and the spring 176 will cause the guide member to move first against the adjacent face of the cleat 31 and finally, when it reaches the inner corner of the cleat 31, to snap behind the cleat to the position shown in Figure 14. The outer face of the guide member 172 is bevelled, as indicated at 172a, and the loop guiding mechanism 166 is adjustably positioned so that this bevelled face guides the leading end of the loop fastener 80 into the notch 31a in the cleat 31.

As soon as the leading end of the loop fastener 80 enters the notch 31a, the air cylinder 184 is again actuated to withdraw the rod 168 to the position shown in Figures 13 and 15. At the beginning of this movement, the guide member 172 engages the inner face of the cleat 31, pressing the guide member 172 in a counterclockwise direction, as viewed in the drawings, against the force of the spring 176 until the guide member clears the inner face of the cleat. The guide member then rides along the adjacent face of the cleat until it engages the projecting end 178c of the retainer 178; this causes it to be pressed further in a counterclockwise direction until it clears the projecting end of the retainer and reaches the retracted position illustrated in Figures 13 and 15. The stop pin 182 then strikes the sleeve 178a of the retainer 178 and moves the retainer away from the cleat 31, against the force of the spring 180, to the position shown in Figures 13 and 15.

After such withdrawal of the loop guiding mechanism 166, the outward movement of the presser arm 148 and presser plate 160 is continued to the point shown in Figure 15, where the outer face of the box end 32 is flush against the inner face of the cleat 31 and the loop fasteners 80 are fully inserted through the notches 31a in the cleat, with the outer ends of the loop fasteners 80 projecting beyond the outer face of the cleat 31.

The loop bending mechanism

The loop fasteners 80 are bent around the outside binding wires 188 of the box blank by the loop bending mechanism generally indicated 190 in Figures 14 and 15. This loop bending mechanism includes a supporting rod 192 which is slidably supported and keyed against rotation in a sleeve 170c in the aforementioned bracket 170.

Pivotally attached at the inner end of the rod 192 is a loop bending member 194 which is urged in a clockwise direction, as viewed in Figures 14 and 15 by means of a coil spring 196 which is tensioned between a pin 198 at the rearward end of the loop bending member 194 and a pin 200 projecting from the sleeve 170c. Clockwise movement of the loop bending member 194 under the influence of the spring 196 is limited by a stop pin 202 projecting from the inner face of the loop bending member 194 into engagement with the upper end of the rod 192. The loop bending member 194 is thus yieldably maintained in the position in which it is shown in Figures 13 and 14 at which it is approximately perpendicular to the axis of the rod 192.

The loop bending mechanism also includes a loop guiding member 204 the purpose of which is to form a guideway to guide the loop fastener 80 beneath the binding wire 188 when the loop fastener is inserted through one of the openings between adjacent slats in a slatted crate blank. The loop guiding member 204 is so located that its beveled tip 204a is aligned with the opening between the slats 30. The guiding member 204 is pivotally mounted at 206 on a sleeve 208 slidably supported and keyed against rotation on the rod 192 and is yieldably urged in a counterclockwise direction about the pivot 206 by a coil spring 210 which is tensioned between a pin 212 on the guiding member 204 and a pin 214 on the sleeve 208. The sleeve 208 in turn is urged outwardly (downwardly as viewed in Figure 14) by a coil spring 215 which is tensioned between pins projecting from the sleeve 208 and from the piston rod 224 of an air cylinder which is secured to the bracket 170.

The guiding member 204 is actuated by an air cylinder 218 (Figure 14) the casing of which is fixed to the casing of the air cylinder 222. The piston rod 220 of the cylinder 218 engages a laterally projecting portion 204b on the guiding member 204. The loop bending operation is commenced by actuation of the air cylinder 218 to cause its piston rod 220 to move inwardly toward the box blank (upwardly as viewed in Figure 14). This imposes on the laterally projecting portion 204b of the guiding member 204 a force which urges the guiding member 204 both to rotate in a counterclockwise direction about its pivot 206 and also to move translationally inward toward the box blank by sliding movement of the sleeve 208 along the rod 192 against the resistance of the spring 215.

The counterclockwise movement of the guiding member 204 about its pivot 206 is limited by engagement between the oblique face of a cam insert 216 (see Figure 14) secured in the corner of the hook-like inner end 204a of the guiding member 204 and a beveled surface 192a at the inner end of the rod 192. However as the guiding member 204 is pressed inwardly by the piston rod 220, its cam insert 216 rides off the beveled surface 192a on the end of the rod 192, allowing the guiding member to rotate in a counterclockwise direction about its pivot 206 until its strikes the outer surface of the sleeve 170c and its beveled tip 204a is inserted into the opening between slats 30 beyond binding wire 188 (see Figure 14). Air cylinder 218 is now allowed to retract and guiding member 204 is pulled back toward binding wire 188 by spring 215 until the shoulder of beveled tip 204a contacts the wire as shown in Figure 15. The beveled tip 204a thus forms a guideway which guides loop fastener 80 beneath binding wire 188 as the box end 32 is inserted by presser plate 160.

The loop bending member 194 and its supporting rod 192 are actuated by means of the aforementioned air cylinder 222, the piston rod 224 of which is secured to the outer end of the rod 192. The air cylinder 222 is actuated to move the rod 192 and the loop bending member 194 inwardly toward the box blank. When the loop bending member 194 reaches the position shown in Figure 15, the leading edge of its outer end strikes the outer face of the cleat 31. Beyond this point as the rod 192 continues its inward movement, the loop bending member 194 pivots in a counterclockwise direction against the force of the spring 196, with the outer end of the loop bending member "wiping" around the corner of the box blank. During this latter movement, the projecting end of the loop fastener 80 is engaged by a crossbar 194a at the outer end of the loop bending member 194 and the loop is bent around the outside binding wire 188 as illustrated in Figure 16.

During the movement of the rod 192 from the position shown in Figure 15 to its final inner position as shown in Figure 16, it engages the guiding member and carries it inwardly of the box blank. Also, because of the angular relationship between the beveled surface 192a at the end of the rod 192 and the oblique face of the cam insert 216 on the guiding member 204, the inward movement of the rod 192 causes the guiding member 204 to be rocked in a clockwise direction about its pivot 206 (Figure 14) against the resistance of the spring 210. The guiding member 204 thus moves obliquely away from the binding wire 188 and from the outer face of the box blank to the position illustrated in Figure 16. This clears the way for the loop fastener 80 to be bent completely around the binding wire 188 and down against the outer surface of the side material 30 of the box blank, as illustrated in Figure 16, to complete the box assembly.

Upon completion of the loop bending operation, the air cylinder 222 is again actuated to return the loop bending mechanism to its retracted position in which it is illustrated in Figure 13.

The conveyer belt

Next, the air cylinders 144 (Figure 2) are again actuated to pivot the clamps 142 upwardly away from the cleats 31 of the assembled box to the vertical positions in which they are shown in Figure 17, releasing the box. Simultaneously, the rollers 34 which support the box are moved laterally outward from beneath it and a pair of vertical conveyer belts 226 (Figures 2 and 17) are brought into engagement with the ends of the box to carry it downwardly on its way out of the machine. This movement of the rollers 34 and conveyer belts 226 is accomplished by means of a pair of air cylinders 228 (Figures 2 and 17), the casings of which are pivotally attached to the lower ends of brackets 230 depending from the overhead beam 158 of the machine frame. The piston rods 232 of these air cylinders 228 are pivotally attached to the upper ends of elongated, generally vertical bars 234 which extend substantially the full height of the machine and are pivotally supported at their lower ends on horizontal shafts 236 which extend longitudinally of the machine. These shafts 236 are rotatably supported in bearings 238 resting on longitudinally extending horizontal beams 239 which in turn rest on the transverse horizontal beams 240 which form part of the foundation of the machine.

The rollers 34 are supported on side plates 241a at the upper ends of levers 241 which are fulcrumed at 241b on arms 242 and 243 extending from the machine frame. The lower ends of these levers 241 are pivotally attached by means of links 244 to the central portions of the vertical bars 234. Thus, actuation of the air cylinders 228 to move the bars 234 toward each other, rotates the levers 241 to move the rollers 34 from beneath the edges of the box, as shown in Figure 17.

Each of the vertical bars 234 rotatably supports a pair of idler pulleys 246 and 247 and a drive pulley 248 is fixed on the aforementioned shaft 236. The aforementioned vertical conveyer belts 226 are trained on these pulleys. Actuation of the air cylinders 228 to move the bars 234 to the position shown in Figure 17 brings the conveyer belts 226 into frictional engagement with the ends of the assembled box.

The conveyer belts 226 are continuously driven in the direction indicated by the arrows in Figure 17 by an electric motor 250 (Figures 1 and 2) through a V-belt 252, and a pulley 254 which is fixed on a transverse drive shaft 256 which extends transversely of the machine and is supported at its ends in pillow blocks 258 resting on the longitudinally extending beams 239. This drive shaft 256 has fixed on it a miter gear 260 (Figure 1) which meshes with a similar miter gear 262 fixed on the same shaft 236 on which the drive pulleys 248 are fixed.

Thus, as the conveyer belts 226 engage the box, they move it downwardly in the machine. As may be seen in Figure 17, the lower end portions of the inner spans of the conveyer belts 226, below the idler pulleys 246, are inclined away from the ends of the assembled box so that as the box moves downwardly to rest upon a group of four spaced, horizontal conveyer belts 264 near the bottom of the machine, the vertical conveyer belts 226 will no longer engage the ends of the box.

These horizontal conveyer belts 264 are supported upon four drive pulleys 265 fixed on the aforementioned drive shaft 256 and four idler pulleys 266 which are supported at the output end of the machine on a transverse shaft 268 supported in pillow blocks 269 resting on the longitudinal beams 239. The conveyer belts 264 are thus continuously driven by the motor 250 (Figures 1 and 2) through the drive shaft 256. Therefore, when the box is deposited on the conveyer bands 264, it is moved in the direction of the arrows shown in Figure 1 and is delivered fully-assembled at the output end of the machine (the right-hand end of the machine as viewed in Figure 1).

Modified machine for assembling box blanks with detached ends

Figures 18–21 illustrate modified loop forming, loop guiding and loop bending mechanisms for accommodating wirebound box blanks having ends which are entirely separate from the box blanks rather than being partially attached. This mechanism is intended to replace the corresponding mechanism of the machine shown in Figure 1–17; in all other respects the machine is unchanged, except, of course, that the box end lifting mechanism is eliminated.

As best seen in Figure 18, this modified embodiment of the invention includes an end pressing mechanism generally indicated 270, a loop guiding mechanism generally indicated 272, and a loop bending mechanism generally indicated 274.

The end pressing mechanism 270 includes a presser plate 276 which depends downwardly from a presser arm 278 (see also Figure 19), the arm 278 extending laterally from one end of a parallelogram suspension assembly best shown in Figure 19 and including a base member 280 and two parallel link members 282 and 284 which are pivotally attached at their upper ends to brackets 286 depending from the frame of the machine. The base member 280 carries at its outer end (its left-hand end as viewed in Figure 19) a cam follower roller 288 which rides against the periphery of a cam 290 keyed on a cam shaft 292 which is rotatably supported on the frame of the machine. The lower end of the parallelogram assembly is urged to the left, as viewed in Figure 19, to maintain the follower roller 288 in engagement with the periphery of the cam 290 by a tension spring 294 (Figure 19) which extends from the machine frame.

The cam 290 and the cam shaft 292 are driven by means of an air cylinder 296, the casing of which is pivotally secured to the frame of the machine and the piston rod 298 (Figure 19) of which is attached to a depending crank portion 290a of the cam 290. The air cylinder 296 has sufficient stroke to rotate the cam 290 and cam shaft 292 through an angle of approximately 90 degrees.

As best seen in Figure 18, the loop guiding assembly 272 includes an elongated, vertically extending anvil bar 300 (see also Figure 19) which is fixed at one end of a supporting rod 302 which extends slidably through and is keyed against rotation in a bearing block 304 which, as may be seen in Figure 19, is supported for lateral sliding movement in an overhead supporting member 306 secured to the frame of the machine. The rod 302 carries at its outer end a follower roller 308 which bears against the periphery of one portion 310a of a compound cam 310 (Figure 18) which is also keyed upon the aforementioned cam shaft 292. The rod 302 is yieldably urged in an outward direction (downward as viewed in Figure 18, leftward as viewed in Figure 19) by means of a coil spring 311 (Figure 19) which is connected under tension between the rod 302 and the bearing block 304. This keeps the follower roller 308 in engagement with the periphery of the portion 310a of the cam 310.

As shown in Figure 18, the bearing block 304 has projecting from one side an arm 312 rotatably supporting at its outer end a follower roller 314 which is received in a slot 310b milled in the face of the compound cam 310, to impart to the bearing block 304 and the rod 302 lateral movement at desired times.

The loop bending mechanism 274 is generally similar to that of the embodiment previously described, except that the loop bending member 316 is provided with a notch 316a which cooperates with a latch member 318 pivotally mounted on a tab 320 extending from one side of the supporting rod 322. The latch 318 is urged in a counterclockwise direction, as viewed in Figure 18, by means of a spring 324. The outer end of the latch 318 (the lower end as viewed in Figure 18) is provided with a bevelled surface 318a which cooperates with a fixed cam 326 in the outer or retracted position of the loop bending mechanism 274 to cam the latch 318 out of engagement with the notch 316a.

Pivotally attached to the loop bending member 316 is one end of a rod 328 which passes through a fixed stop member 330 extending from the frame of the machine and is provided with adjustable stop nuts 332.

This mechanism operates as follows: At the commencement of each box assembly cycle, the cams 290 and 310 are in the positions in which they are illustrated in Figure 19. These cams are so shaped that, when they are so positioned, the presser plate 276 is in its innermost position and the anvil bar 300 is slightly spaced from it to form a channel into which the box ends 32 may be dropped edgewise from above, either by hand or from a hopper with a mechanical destacking device.

At this time, the loop bending mechanism 274 is in its inner position, as illustrated in Figure 18. In this position, the latch 318 is in engagement with the notch 316a in the loop bending member 316 and maintains the loop bending member in an oblique position relative to the supporting rod 322, against the force of the spring 196.

As the cycle commences, the air cylinder 296 is actuated to initiate rotation of the cams 290 and 310 through a quarter revolution as previously described. By virtue of the shape of the surface 310a of the cam 310, the rod 302 first moves inwardly toward the box blank to cause the anvil bar 300 to engage the outer face of the box end 32 and hold it firmly against the presser plate 276.

The air cylinder 222 is then actuated to withdraw the rod 322 and the loop bending member 316, causing the end of the loop bending member to engage the projecting loop fastener 80 and bend it around the anvil bar 300 substantially perpendicular to the outer face of the box end 32.

When the loop bending mechanism 274 reaches its outermost position, as illustrated in Figure 20, the inclined surface 318a at the outer end of the latch 318 engages the cam 326. This cams the latch 318 in a clockwise direction, against the force of the spring 324, to remove the end of the latch from the notch 316a in the loop bending member 316 and allow the spring 196 to rotate the loop bending member 316 to the position shown in Figure 20 at which it is substantially perpendicular to the axis of the rod 322.

As the cams 290 and 310 continue their rotation, the presser plate 276 and the anvil bar 300 move together in an outward direction (downwardly as viewed in Figure 20) until they reach the position shown in broken lines in Figure 20. At this point, the anvil bar will have guided the outer ends of the loop fasteners 80 into the notches 31a in the cleat, and the cam slot 310b will move the bearing block 304, the rod 302 and the anvil bar 300 leftward, as viewed in Figure 20, so that the anvil bar 300 will clear the cleat 31.

As the cams 290 and 310 continue their rotation, the presser plate 276 pushes the box end 32 flush against the inner face of the cleat 31 and causes each of the loop fasteners 80 to be fully inserted through one of the notches 31a in the cleat 31, as illustrated in Figure 21. In this position, the end of the loop 80 projects beyond the end of the box in position to be engaged by the cross bar 316b of the loop bending member 316 and bent around the outside binding wire 188 of the box blank in the manner previously described, when the air cylinder 222 (Figure 14) is again actuated to drive the rod 322 inwardly.

As the loop bending mechanism again moves to its innermost position, as illustrated in Figure 18, the stop nuts 332 on the rod 328 engage the stop 330 and the loop bending member 316 is rotated to its extreme counterclockwise position against the force of the spring 196, allowing the latch 318 to be moved into the notch 316a in the loop bending member 316 by the spring 324, thus readying the loop bending mechanism for the next cycle of operation.

The assembled wirebound boxes are then removed in the same manner as described in connection with the embodiment shown in Figures 1–17.

From the foregoing description it will be appreciated that the present invention provides a practical machine for assembling knocked down wirebound box blanks, having either separate or attached box ends. It should be emphasized, however, that the particular embodiments of the invention which are described herein and shown in the accompanying drawings are intended as merely illustrative rather than as restrictive of the invention.

We claim:

1. A machine for assembling wirebound boxes from knocked-down box blanks of the type having top, rear, bottom and front side sections foldably secured together, with openings near the ends of said front and rear side sections with box ends having wire fasteners projecting from the edges thereof, comprising a frame arranged to receive and support said box blanks, and a plurality of machine members movably mounted on said frame in position for respective engagement with various elements of said box blanks, said machine members including fastener forming members arranged to engage said wire fasteners and bend them so that they project generally perpendicularly from the outer surfaces of said box ends, side folding members arranged to engage the front and rear side sections of said box blanks and fold them upwardly about the bottom section thereof to positions substantially perpendicular thereto, end pressing members arranged to engage the inner faces of said box ends and push them outwardly so as to cause said wire fasteners to pass through the openings in said front and rear side sections, and fastener bending members arranged to engage the portions of said wire fasteners projecting through said openings and bend said wire fasteners around a portion of said front and rear side sections to secure the boxes assembled, and motive means coupled to said machine members for driving them to perform the aforesaid operations.

2. A machine for assembling wirebound boxes from knocked-down box blanks of the type having top, rear, bottom and front side sections foldably secured together, with openings near the ends of said front and rear side sections and box ends foldably secured at one edge to said front and rear side sections and with wire fasteners projecting from the free edges of said box ends, comprising a frame arranged to receive and support said box blanks, and a plurality of machine members movably mounted on said frame in position for respective engagement with various elements of said box blanks, said machine members including end lifting members arranged to engage the box ends and lift them to acute angles relative to said front and rear side sections, fastener forming members arranged to engage wire fasteners projecting from the box ends and bend them so that they project generally perpendicularly from the outer surfaces of said box ends, side folding members arranged to engage the front and rear side sections of said box blanks and fold them upwardly about the bottom section thereof to positions substantially perpendicular thereto, end pressing members arranged to engage the inner faces of said box ends and push them outwardly so as to cause said wire fasteners to pass through openings in said front and rear side sections, and fastener bending members arranged to engage the portions of said wire fasteners projecting through said openings and bend said wire fasteners around a portion of said front and rear side sections to secure the boxes assembled, and motive means coupled to said machine members for driving them to perform the aforesaid operations.

3. A machine for assembling wirebound boxes from knocked-down box blanks of the type having top, rear, bottom and front side sections foldably secured together, with openings near the ends of said front and rear side sections and box ends foldably secured at one edge to said front and rear side sections and with wire fasteners projecting from the free edges of said box ends, comprising a frame arranged to receive and support said box blanks, and a plurality of machine members movably mounted on said frame in position for respective engagement with various elements of said box blanks, said machine members including end lifting members positioned above the position of the front and rear side sections of the box blanks in said machine, said end lifting members being arranged to engage the box ends and lift them to acute angles relative to said front and rear side sections, and being shiftable from said positions over said front and rear side sections to positions over the bottom sections of said box blanks, fastener forming members arranged to engage wire fasteners projecting from the box ends and bend them so that they project generally perpendicularly from the outer surfaces of said box ends, side folding members arranged to engage the front and rear side sections of said box blanks and fold them upwardly about the bottom section thereof to positions substantially perpendicular thereto, end pressing members arranged to engage the inner faces of said box ends and push them outwardly so as to cause said wire fasteners to pass through openings in said front and rear side sections, and fastener bending members arranged to engage the portions of said wire fasteners projecting through said openings and bend said wire fasteners around a portion of said front and rear side sections to secure the boxes assembled, and motive means coupled to said machine members for driving them to perform the aforesaid operations.

4. A machine for assembling wirebound boxes from knocked-down box blanks of the type having top, rear, bottom and front side sections foldably secured together, with openings near the ends of said front and rear side sections with box ends having wire fasteners projecting from the edges thereof, comprising a frame arranged to receive and support said box blanks, and a plurality of machine members movably mounted on said frame in position for respective engagement with various elements of said box blanks, said machine members including anvil members arranged to engage the outer surfaces of the box ends near their edges from which wire fasteners project outwardly, fastener forming members arranged to engage said wire fasteners and bend them around said anvil members to position generally perpendicular to the outer surfaces of said box ends, side folding members arranged to engage the front and rear side sections of said box blanks and fold them upwardly about the bottom section thereof to positions substantially perpendicular thereto, end pressing members arranged to engage the inner faces of said box ends and push them outwardly so as to cause said wire fasteners to pass through openings in said front and rear side sections, and fastener bending members arranged to engage the portions of said wire fasteners projecting through said openings and bend said wire fasteners around a portion of said front and rear side sections to secure the boxes assembled, and motive means coupled to said machine members for driving them to perform the aforesaid operations.

5. A machine for assembling wirebound boxes from knocked-down box blanks of the type having top, rear, bottom and front side sections foldably secured together, with openings near the ends of said front and rear side sections with box ends having wire fasteners projecting from the edges thereof, comprising a frame arranged to receive and support said box blanks, and a plurality of machine members movably mounted on said frame in position for respective engagement with various elements of said box blanks, said machine members including anvil members arranged to engage the outer surfaces of the box ends near their edges from which loop fasteners project outwardly, a plurality of pairs of fastener forming fingers, one pair for each of said loop fasteners, said fingers being arranged to press said loop fastener inwardly from opposite sides to straighten it and then to bend said loop fastener around one of said anvil members to a position generally perpendicular to the outer surface of the box end, side folding members arranged to engage the front and rear side sections of said box blanks and fold them upwardly about the bottom section thereof to positions substantially perpendicular thereto, end pressing members arranged to engage the inner faces of said box ends and push them outwardly so as to cause said loop fasteners to pass through openings in said front and rear side sections, and fastener bending members arranged to engage the portions of said loop fasteners projecting through said openings and bend said loop fasteners around a portion of said front and rear side sections to secure the boxes assembled, and motive means coupled to said machine members for driving them to perform the aforesaid operations.

6. A machine for assembling wirebound boxes from knocked-down box blanks of the type having top, rear, bottom and front side sections foldably secured together, with openings near the ends of said front and rear side sections and box ends foldably secured at one end to said front and rear side sections and with wire fasteners projecting from the free edges of said box ends, comprising a frame arranged to receive and support said box blanks, and a plurality of machine members movably mounted on said frame in position for respective engagement with various elements of said box blanks, said machine members including end lifting members arranged to engage the box ends and lift them to acute angles relative to said front and rear side sections, anvil members arranged to engage the outer surfaces of the box ends near their edges from which wire fasteners project outwardly, fastener forming members arranged to engage said wire fasteners and bend them around said anvil members to positions generally perpendicular to the outer surfaces of said box ends, said anvil members and said fastener forming members being mounted for movement outwardly from said box ends at the completion of said loop forming operation, side folding members arranged to engage the front and rear side sections of said box blanks and fold them upwardly about the bottom section thereof to positions substantially perpendicular thereto, end pressing members arranged to engage the inner faces of said box ends and push them outwardly so as to cause said wire fasteners to pass through openings in said front and rear side sections, and fastener bending members arranged to engage the portions of said wire fasteners projecting through said openings and bend said wire fasteners around a portion of said front and rear side sections to secure the boxes assembled, and motive means coupled to said machine members for driving them to perform the aforesaid operations.

7. A machine for assembling wirebound boxes from knocked-down box blanks of the type having top, rear, bottom and front side sections foldably secured together, with openings near the ends of said front and rear side sections with box ends having wire fasteners projecting from the edges thereof, comprising a frame arranged to receive and support said box blanks, and a plurality of machine members movably mounted on said frame in position for respective engagement with various elements of said box blanks, said machine members including fastener forming members arranged to engage wire fasteners projecting from the box ends and bend them so that they project generally perpendicularly from the outer surfaces of said box ends, side folding members arranged to engage the front and rear side sections of said box blanks and fold them upwardly about the bottom section thereof to positions substantially perpendicular thereto, end pressing members arranged to engage the inner faces of said box ends and push them outwardly so as to cause said wire fasteners to pass through openings in said front and rear side sections, guide members movable into positions adjacent said openings and having bevelled surfaces for guiding the ends of said wire fasteners into said openings and retractible away from the assembled boxes to permit their movement out of said machine, and fastener bending members arranged to engage the portions of said wire fasteners projecting through said openings and bend said wire fasteners around a portion of said front and rear side sections to secure the boxes assembled, and motive means coupled to said machine members for driving them to perform the aforesaid operations.

8. A machine for assembling wirebound boxes from knocked-down box blanks of the type having top, rear, bottom and front side sections formed of side material with notched cleats secured at the inner face thereof along the lateral edges of said box blanks, and box ends with wire fasteners projecting from the free edges of said box ends, said machine comprising a frame arranged to receive and support said box blanks, and a plurality of machine members movably mounted on said frame in position for respective engagement with various elements of said box blanks, said machine members including fastener forming members arranged to engage said wire fasteners and bend them so that they project generally perpendicularly from the outer surfaces of said box ends, side folding members arranged to engage the front and rear side sections of said box blanks and fold them upwardly about the bottom section thereof to positions substantially perpendicular thereto, end pressing members arranged to engage the inner faces of said box ends and push them outwardly so as to cause said wire fasteners to pass through openings in said front and rear side sections, a plurality of fastener guide assemblies, each mounted on said frame adjacent one of the fasteners projecting through said openings, each of said guide assemblies including a support member and a retaining member mounted thereon for yielding movement longitudinally thereof, said members being movable together inwardly toward said box blanks, said support member also carrying a guide member having a bevelled outer face mounted thereon for yieldable movement generally transversely of said support member, said guide member being held in a retracted position behind said retaining member until said retaining member engages the adjacent cleat on said box blank, whereupon inward movement of said retaining member stops and said guide member is allowed to move inwardly around the inner face of said cleat with its bevelled outer face adjacent one of the notches therein to guide the adjacent wire fastener into said notch, and said guide assemblies being movable away from the assembled boxes to permit their movement out of said machine, and motive means coupled to said assemblies and to each of said machine members for driving them to perform the aforesaid operations in the order named.

9. A machine for assembling wirebound boxes from knocked-down box blanks of the type having top, rear, bottom and front side sections foldably secured together, with openings near the ends of said front and rear side sections with box ends having wire fasteners projecting from the edges thereof, comprising a frame arranged to receive and support said box blanks, and a plurality of machine members movably mounted on said frame in position for respective engagement with various elements of said box blanks, said machine members including fastener forming members arranged to engage wire fasteners projecting from the box ends and bend them so that they project generally perpendicularly from the outer surfaces of said box ends, side folding members arranged to engage the front and rear side sections of said box blanks and fold them upwardly about the bottom section thereof to positions substantially perpendicular thereto, end pressing members arranged to engage the inner faces of said box ends and push them outwardly so as to cause said wire fasteners to pass through openings in said front and rear side sections, and a plurality of fastener bending assemblies, each mounted on said frame adjacent one of the fasteners projecting through said openings, each of said fastener bending assemblies including a support member and a loop bending member yieldingly mounted thereon, said loop bending member having a hook portion adapted to engage the portion of said wire fastener projecting through said opening, said fastener bending assembly being arranged for transverse movement toward said box blank to cause the hook portions of said loop bending members to engage said wire fastener and to bend it around a corner of said box blank, and for movement away from the assembled box to allow it to move out of said machine, and motive means coupled to said assemblies and to each of said machine members for driving them to perform the aforesaid operations in the order named.

10. A machine for assembling wirebound crates from knocked-down crate blanks of the type having top, bottom, rear and front side sections formed of spaced slats with notched cleats secured at the inner faces thereof along the lateral edges of said box blanks, and box ends with wire fasteners projecting from the free edges of said box ends, said machine comprising a frame arranged to receive and support said box blanks, and a plurality of machine members movably mounted on said frame in position for respective engagement with various elements of said box blanks, said machine members including fastener forming members arranged to engage wire fasteners projecting from the crate ends and bend them so that they project generally perpendicularly from the outer surfaces of said crate ends, side folding members arranged to engage the front and rear side sections of said crate blanks and fold them upwardly about the bottom section thereof to positions substantially perpendicular thereto, end pressing members arranged to engage the inner faces of said crate ends and push them outwardly so as to cause said wire fasteners to pass through openings in said front and rear side sections, and a plurality of fastener bending assemblies, each mounted on said frame adjacent one of the fasteners projecting through said openings, each of said fastener bending assemblies including a support member, a loop bending member yieldingly mounted on said support member, a guiding member movably mounted on said support member, driving means to move said guiding member behind the adjacent binding wire thereon in position to guide the loop fastener beneath said binding wire as said crate ends are pushed outwardly by said end pressing members, and then to move said support member to cause said fastener bending member to engage said fastener and bend it through one of the spaces between adjacent slats on said side section and around said binding wire, and to cause said support member to engage said guiding member and move it out of the way of the wire fastener, and said loop bending assembly being movable away from the assembled crate to allow it to move out of said machine, and motive means coupled to said assemblies and to each of said machine members for driving them to perform the aforesaid operations in the order named.

References Cited in the file of this patent

UNITED STATES PATENTS

| | | |
|---|---|---|
| 914,820 | Gentle | Mar. 9, 1909 |
| 2,655,843 | Baker et al. | Oct. 20, 1953 |